(12) United States Patent
Cheng et al.

(10) Patent No.: US 9,265,205 B2
(45) Date of Patent: Feb. 23, 2016

(54) MULTIFUNCTIONAL PLANTING SYSTEM

(71) Applicant: Chunghwa Picture Tubes, Ltd., Taoyuan (TW)

(72) Inventors: Min-Chung Cheng, New Taipei (TW); Min-Lun Wu, Miaoli County (TW); Tso-Hsuan Yeh, Taoyuan County (TW); Che-Wei Chang, Taoyuan County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 105 days.

(21) Appl. No.: 14/139,883

(22) Filed: Dec. 24, 2013

(65) Prior Publication Data
US 2015/0128495 A1    May 14, 2015

(30) Foreign Application Priority Data
Nov. 8, 2013   (TW) .............................. 102220923 U

(51) Int. Cl.
*A01G 31/02* (2006.01)

(52) U.S. Cl.
CPC ...................................... *A01G 31/02* (2013.01)

(58) Field of Classification Search
CPC ....... A01G 31/02; A01G 27/00; A01G 27/02; A01G 27/04; A01G 27/06; A01G 27/006
USPC .............. 47/62 R, 62 A, 62 C, 62 E, 62 N, 63
See application file for complete search history.

(56) References Cited

U.S. PATENT DOCUMENTS

| | | | | |
|---|---|---|---|---|
| 4,911,866 A * | 3/1990 | Monroe | ................ | B01F 3/0407 239/102.2 |
| 5,518,179 A * | 5/1996 | Humberstone | ..... | B05B 17/0646 239/102.2 |
| 5,969,620 A * | 10/1999 | Okulov | ......................... | 340/620 |
| 6,345,470 B1 * | 2/2002 | Slaght et al. | ...................... | 47/79 |
| 7,090,028 B2 * | 8/2006 | Adiga | ...................... | A62C 5/00 169/47 |
| 7,677,695 B2 * | 3/2010 | Giri et al. | ......................... | 347/44 |
| 9,125,351 B2 * | 9/2015 | Wu | ......................... | A01G 31/02 |
| 2011/0023359 A1 * | 2/2011 | Raring | ........................... | 47/62 A |

* cited by examiner

Primary Examiner — Kristen C Hayes
Assistant Examiner — Ebony Evans
(74) Attorney, Agent, or Firm — Winston Hsu; Scott Margo

(57) ABSTRACT

A multifunctional planting system includes a supporter and a spraying device. The supporter includes a base and a plurality of lateral walls. The lateral walls are bent from the base to form a sunken structure for storing nutrient solution. The spraying device is disposed on the supporter. The spraying device includes an accommodating structure, a buckling component and a piezoelectric component. The nutrient solution is accommodated inside the accommodating structure. The buckling component passes through the accommodating structure. The piezoelectric component is disposed on a hollow portion of the buckling component. A plurality of tiny apertures are formed on the piezoelectric component. The piezoelectric component receives an electronic signal to generate oscillation. The oscillation transforms the liquid nutrient solution inside the accommodating structure into the gaseous nutrient solution. The gaseous nutrient solution is sprayed via the plurality of tiny apertures, and is condensed to flow into the sunken structure.

9 Claims, 4 Drawing Sheets

MULTIFUNCTIONAL PLANTING SYSTEM

BACKGROUND OF THE INVENTION

1. Field of the Invention

The present invention relates to a planting system, and more particularly, to a multifunctional planting system with advantages of water economy and power economy.

2. Description of the Prior Art

A conventional indoor planting system utilizes deep flow hydroponics technique and mist spray hydroponics technique to grow the plant. Lots of water and dissolved oxygen are necessary in the deep flow hydroponics technique to provide better environment for planting the plant. Drawbacks of the deep flow hydroponics technique are large consumption of the water and limited supply of the dissolved oxygen. The mist spray hydroponics technique sprays the water to the roots of the plant for water economy. However, the mist spray hydroponics technique utilizes the motor to transform the water into vapor, which has the drawback of high power consumption.

SUMMARY OF THE INVENTION

The present invention provides a multifunctional planting system with advantages of water economy and power economy for solving above drawbacks.

According to the claimed invention, a multifunctional planting system includes at least one supporter and a spraying device. The supporter includes a base and a plurality of lateral walls. The lateral walls are bent from sides of the base to form a sunken structure for storing nutrient solution. The spraying device is detachably disposed on the supporter. The spraying device includes an accommodating structure, a buckling component and a piezoelectric component. The nutrient solution is accommodated inside the accommodating structure. The buckling component passes through the accommodating structure. The buckling component includes a hollow portion whereinside the piezoelectric component is disposed. A plurality of tiny apertures are formed on a surface of the piezoelectric component. The piezoelectric component receives an electronic signal to generate oscillation. The oscillation transforms the liquid nutrient solution inside the accommodating structure into the gaseous nutrient solution. The gaseous nutrient solution is sprayed via the plurality of tiny apertures, and is condensed to flow into the sunken structure.

The multifunctional planting system of the present invention utilizes the piezoelectric component to be a driver of the spraying device for power economy. The multifunctional planting system has advantages of deep flow hydroponics technique and mist spray hydroponics technique, the fewer nutrient solution is applied to provide enough nutrition to the plant. The multifunctional planting system utilizes the spraying device to spray the gaseous nutrient solution to the roots of the plant exposed in air for developed planting, and further utilizes the supporter to store the thin-layer liquid nutrient solution for immersion of the roots of the plant, so as to prevent the plant from unabsorbing the nutrient solution due to accident stop (such as power failure) of the spraying device.

DETAILED DESCRIPTION

Figure 1:
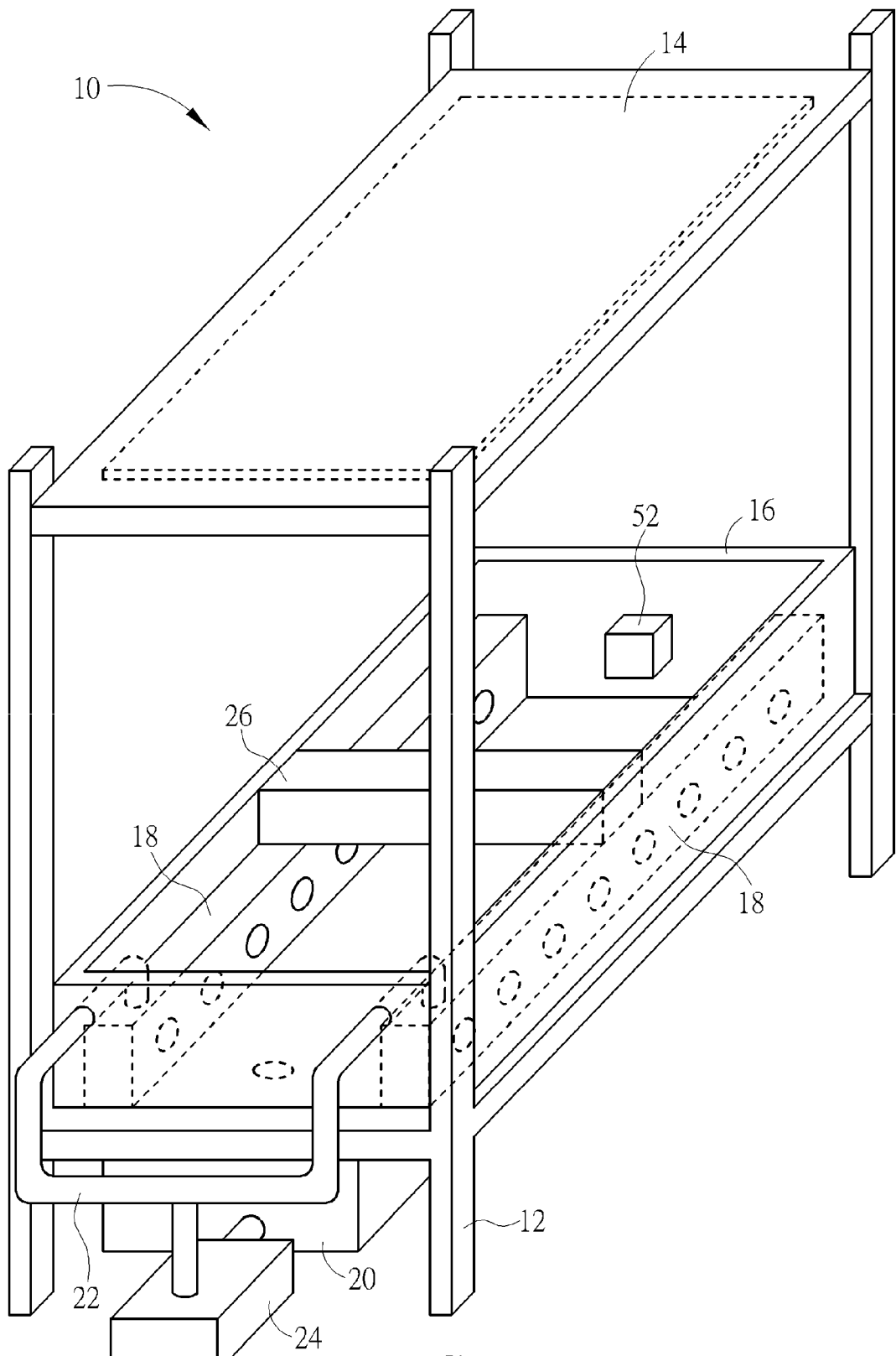
FIG. 1 is a diagram of a multifunctional planting system according to an embodiment of the present invention.

Please refer to FIG. 1. FIG. 1 is a diagram of a multifunctional planting system 10 according to an embodiment of the present invention. The multifunctional planting system 10 includes a holder 12, a light source 14, at least one supporter 16, a spraying device 18, a reservoir 20, a connective tube 22 and a transmission pump 24. An amount of the supporter 16 can be one or more. The supporters 16 are respectively stacked on corresponding position of the holder 12. The light source 14 can be a light emitting diode. Light outputted from the light source 14 is projected to the supporter 16 for a plant. The spraying device 18 is detachably disposed on the supporter 16. An amount of the spraying device 18 is determined according to user's demand, and the spraying device 18 can be omitted herein selectively.

The multifunctional planting system 10 grows the plant by hydroponics. The plant is cultivated in the pot 26, and the pot 26 is suspended over the supporter 16. The reservoir 20 is adapted to store nutrient solution for the plant. The connective tube 22 is connected to the spraying device 18, and the transmission pump 24 is disposed between the reservoir 20 and the connective tube 22. The transmission pump 24 can transmit the nutrient solution inside the reservoir 20 to the spraying device 18 via the connective tube 22. The liquid nutrient solution is transformed into the gaseous nutrient solution by the spraying device 18, and the gaseous nutrient solution is sprayed into the supporter 16, so the plant inside the pot 26 can effectively assimilate the nutrient solution. Amounts of the light source 14 and the spraying device 18 correspond to the amount of the supporter 16, and a detailed description is omitted herein for simplicity.

Figure 2:
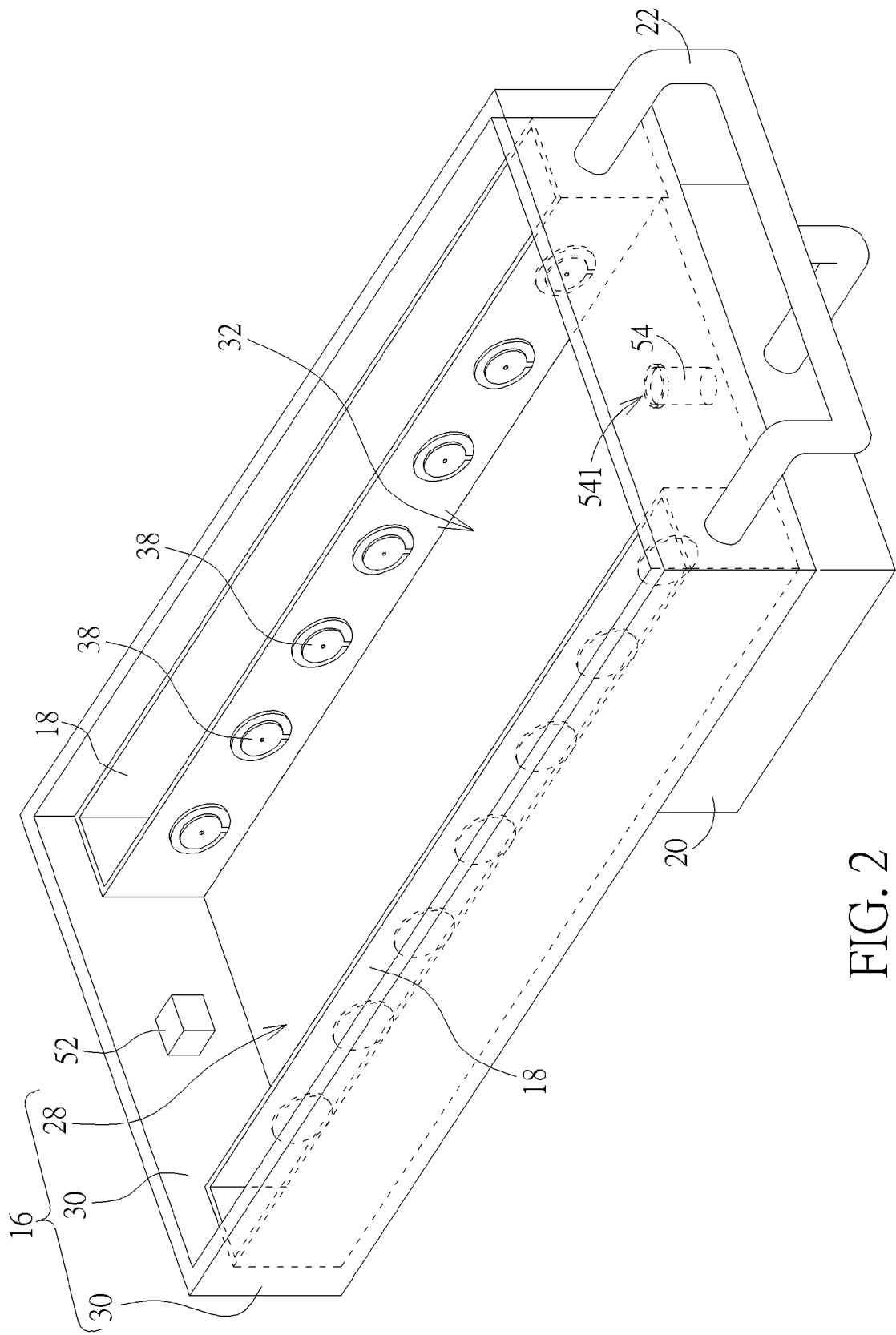
FIG. 2 is a diagram of a supporter and a spraying device according to the embodiment of the present invention.

Please refer to FIG. 2. FIG. 2 is a diagram of the supporter 16 and the spraying device 18 according to the embodiment of the present invention. The supporter 16 includes a base 28 and a plurality of lateral walls 30. The lateral walls 30 are bent from sides of the base 28 to form a sunken structure 32. The sunken structure 32 is adapted to store the nutrient solution, which has depth of 1~5 cm. Generally, two spraying devices 18 can be respectively disposed on opposite edges of the sunken structure 32, and each spraying device 18 is installed on the corresponding lateral wall 30. The plant of the pot 26 can be positioned at middle of the sunken structure 32. The gaseous nutrient solution is sprayed toward the middle of the sunken structure 32 from the supporters 16 whereon the spraying devices 18 are disposed, to ensure that the roots of the plant can assimilate the nutrient solution.

Figure 3:
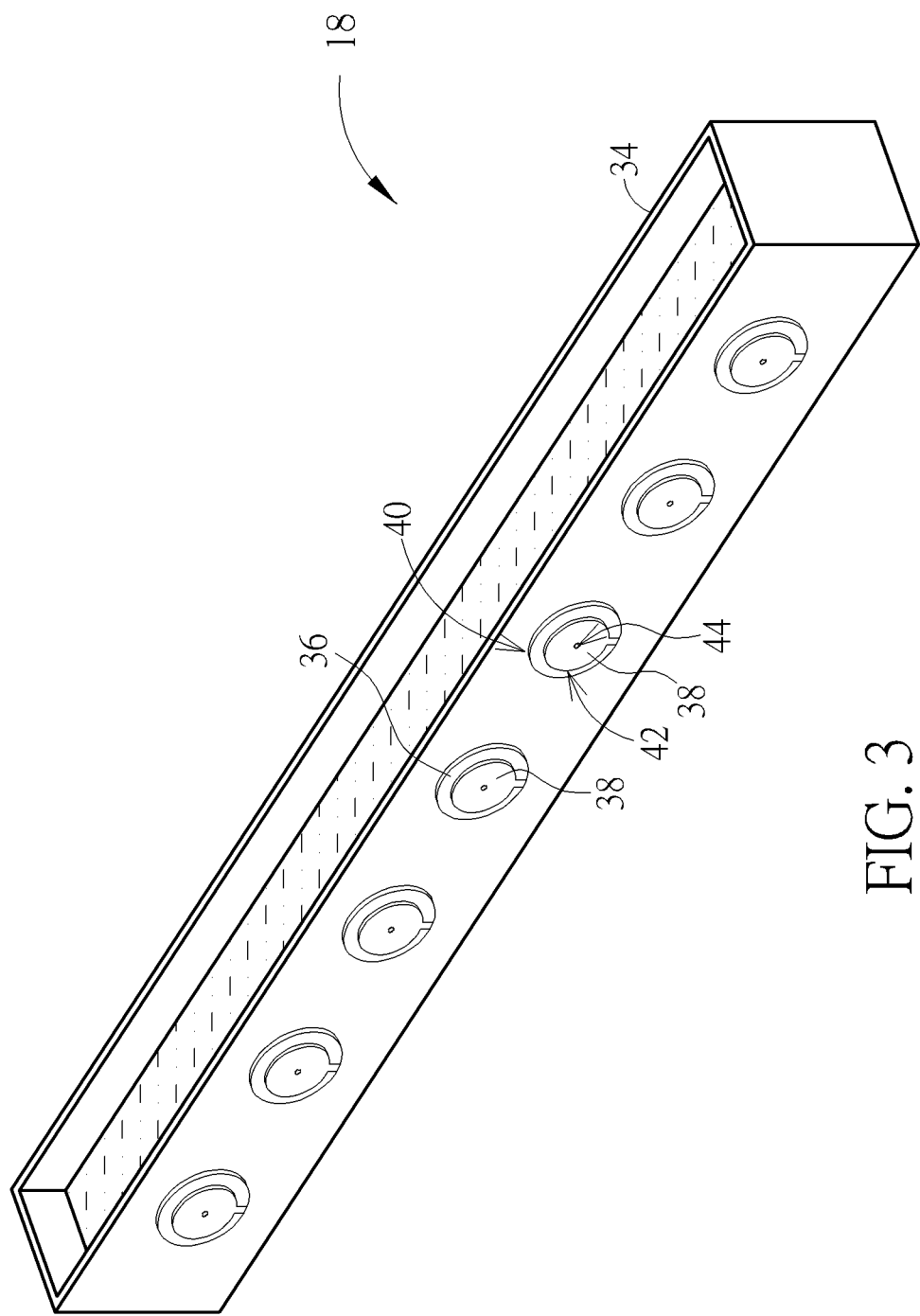
FIG. 3 is a diagram of the spraying device according to the embodiment of the present invention.
Figure 4:
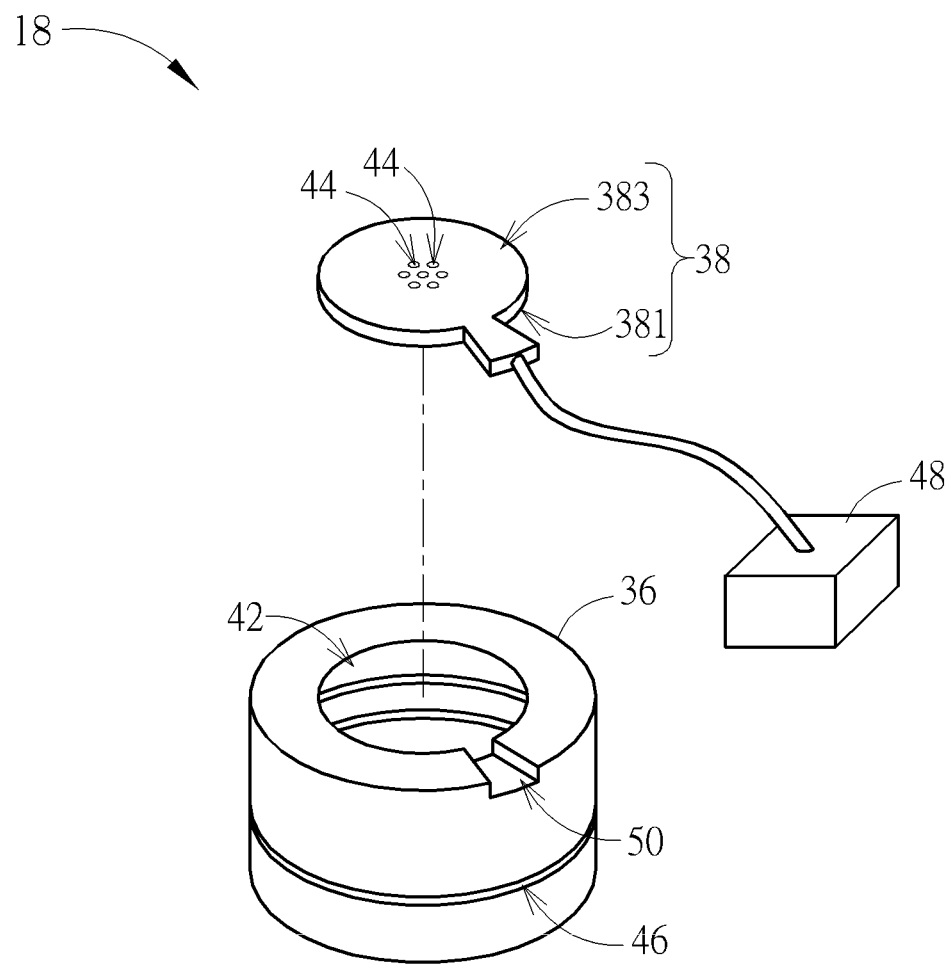
FIG. 4 is a partial diagram of the spraying device according to the embodiment of the present invention.

Please refer to FIG. 3. FIG. 3 is a diagram of the spraying device 18 according to the embodiment of the present invention. The spraying device 18 includes an accommodating structure 34, a buckling component 36 and a piezoelectric component 38. The accommodating structure 34 is adapted to accommodate the nutrient solution. The supporter 16, the reservoir 20 and the accommodating structure 34 are made of acid/soda-proof and waterproof material. An opening 40 can be formed on a wall of the accommodating structure 34, and the buckling component 36 passes through the opening 40 to buckle with the accommodating structure 34. The piezoelectric component 38 can be structurally deformed by input voltage. Oscillation frequency and oscillation amplitude of the piezoelectric component 38 correspond to value of the input voltage. Property of the buckling component 36 and the piezoelectric component 38 are set according to design demand. Each piezoelectric component 38 is disposed inside the hollow portion 42 of the buckling component 36. When the piezoelectric component 38 contacts the nutrient solution inside the accommodating structure 34 and receives the electronic signal to generate the oscillation, the high-frequency piezoelectric component 38 sprays the nutrient solution via a tiny aperture 44 in gaseous state. The plurality of tiny apertures 44 can be formed on a surface of the piezoelectric component 38.

Please refer to FIG. 4. FIG. 4 is a partial diagram of the spraying device 18 according to the embodiment of the present invention. The buckling component 36 is a hollow annular structure, and is made of waterproof and resiliently deformable material. An annular slot 46 is formed on an outer surface of the buckling component 36. The buckling component 36 utilizes the annular slot 46 to buckle with the opening 40 on the accommodating structure 34. The piezoelectric component 38 includes a first lateral surface 381 and a second lateral surface 383 opposite to each other. The first lateral surface 381 contacts the nutrient solution inside the accommodating structure 34. The second lateral surface 383 faces the sunken structure 32. As shown in FIG. 2, the spraying device 18 is disposed on one of the lateral walls 30, and the piezoelectric component 38 faces toward the base 28. The spraying device 18 further can include a power supply 48 electrically connected to the piezoelectric component 38. The power supply 48 can output the electronic signal to the piezoelectric component 38 according to a predetermined parameter, so as to drive the piezoelectric component 38 to spray the gaseous nutrient solution accordingly. The buckling component 36 further can include a sunken slot 50 selectively. The sunken slot 50 is adapted to accommodate a cable connected between the piezoelectric component 38 and the power supply 48.

As shown in FIG. 1 to FIG. 4, the multifunctional planting system 10 further can include a sensor 52 disposed inside the supporter 16 and electrically connected to the power supply 48. The sensor 52 can be a water-level sensing unit to sense volume of the nutrient solution inside the sunken structure 32, and to drive the power supply 48 to output the electronic signal according to a sensing result. For example, when the nutrient solution inside the sunken structure 32 is under a predetermined level, the sensor 52 is triggered to actuate the power supply 48, and the power supply 48 drives the piezoelectric component 38 to spray the gaseous nutrient solution. When the nutrient solution inside the sunken structure 32 is higher than the predetermined level, the power supply 48 is shut down by the sensor 52, and the piezoelectric component 38 stops spraying the nutrient solution. Therefore, the multifunctional planting system 10 of the present invention not only can spray the nutrient solution according to the predetermined parameter of the power supply 48, but also can utilize water-level detecting function of the sensor 52 to automatically determine whether the power supply 48 is actuated to spray the nutrient solution.

Besides, the multifunctional planting system 10 further can include an overflow hole structure 54. An end (the open end 541) of the overflow hole structure 54 is disposed on the base 28 of the supporter 16, and the other end of the overflow hole structure 54 is connected to the reservoir 20. The overflow hole structure 54 is movably disposed on the base 28. Height of the open end 541 of the overflow hole structure 54 can be varied according to actual demand, so as to adjust a distance between the base 28 and the open end 541. The sunken structure 32 of the supporter 16 can contain the nutrient solution which has the water-level lower than the open end 541. As the water-level of the nutrient solution is higher than the open end 541, the nutrient solution flows into the reservoir 20 via the overflow hole structure 54 to recycle the inapplicable nutrient solution.

The pot of the multifunctional planting system is disposed on the supporter in a height adjustable manner. In the present invention, roots of the plant are partly exposed in air according to height difference between the pot and the supporter, so as to receive the gaseous nutrient solution generated by the spraying device. The roots of the plant are further partly immersed in the liquid nutrient solution inside the sunken structure, and immersion depth can equal 2~4 cm. As the insufficient nutrient solution inside the sunken structure is sensed by the sensor, the spraying device can be actuated to execute spray operation, and the transmission pump can be actuated to transmit the nutrient solution from the reservoir to the accommodating structure of the spraying device. The spraying device utilizes the piezoelectric component to transform the liquid nutrient solution inside the accommodating structure into the gaseous nutrient solution, and the gaseous nutrient solution is sprayed into the pot inside the supporter to irrigate the suspended roots of the plant. The gaseous nutrient solution can further be condensed into the liquid nutrient solution (such as forming on the roots of the plant), and falls into the supporter to form a thin layer inside the sunken structure. The liquid nutrient solution flows into the reservoir when the water-level of the nutrient solution inside the sunken structure is higher than the overflow hole structure. The nutrient solution inside the reservoir can be transmitted to the accommodating structure of the spraying device by next actuation of the transmission pump.

In conclusion, the multifunctional planting system of the present invention utilizes the piezoelectric component to be a driver of the spraying device for power economy. The multifunctional planting system has advantages of deep flow hydroponics technique and mist spray hydroponics technique, the fewer nutrient solution is applied to provide enough nutrition to the plant. The multifunctional planting system utilizes the spraying device to spray the gaseous nutrient solution to the roots of the plant exposed in air for developed planting, and further utilizes the supporter to store the thin-layer liquid nutrient solution for immersion of the roots of the plant, so as to prevent the plant from unabsorbing the nutrient solution due to accident stop (such as power failure) of the spraying device.

What is claimed is:

1. A multifunctional planting system comprising:

at least one supporter, the at least one supporter comprising a base and a plurality of lateral walls, the lateral walls being bent from sides of the base to form a sunken structure for storing nutrient solution;

a spraying device detachably disposed on the at least one supporter, the spraying device comprising:

an accommodating structure for accommodating the nutrient solution;

a buckling component passing through the accommodating structure, a hollow portion being formed in the buckling component;

a piezoelectric component disposed inside the hollow portion, a plurality of tiny apertures being formed on a surface of the piezoelectric component; and a power supply electrically connected to the piezoelectric component, the power supply outputting an electronic signal to the piezoelectric component according to a predetermined parameter; and a sensor disposed on the at least one supporter and electrically connected to the power supply, the sensor sensing volume of the nutrient solution inside the sunken structure and driving the power supply to output the electronic signal according to a sensing result;

wherein the piezoelectric component receives an electronic signal to generate oscillation, the oscillation transforms liquid nutrient solution inside the accommodating structure into gaseous nutrient solution, the gaseous nutrient solution is sprayed via the plurality of tiny apertures and is condensed to flow into the sunken structure.

2. The multifunctional planting system of claim 1, wherein the spraying device is disposed on one of the lateral walls, and the piezoelectric component is disposed on a side of the accommodating structure adjacent to a center of the sunken structure of the base.

3. The multifunctional planting system of claim 1, wherein the buckling component is made of waterproof and resiliently deformable material, a slot is formed on an outer surface of the buckling component, and the buckling component is buckled with an opening of the accommodating structure via the slot.

4. The multifunctional planting system of claim 1, wherein the piezoelectric component comprises a first lateral surface and a second lateral surface opposite to each other, the first lateral surface contacts the nutrient solution inside the accommodating structure, and the second lateral surface faces inside the sunken structure.

5. The multifunctional planting system of claim 1, further comprising:

a reservoir for storing the nutrient solution;

a connective tube connected to the spraying device; and a transmission pump disposed between the reservoir and the connective tube, the transmission pump transmitting the nutrient solution inside the reservoir to the accommodating structure of the spraying device via the connective tube.

6. The multifunctional planting system of claim 5, further comprising:

an overflow hole structure disposed on the base of the at least one supporter and connected to the reservoir.

7. The multifunctional planting system of claim 6, wherein the overflow hole structure is movably disposed on the base to adjust a distance between the base and an opening of the overflow hole structure.

8. The multifunctional planting system of claim 1, further comprising:

a holder whereon the at least one supporter is disposed; and a light source disposed on the holder to transmit light toward the at least one supporter.

9. The multifunctional planting system of claim 1, further comprising:

a pot disposed on the at least one supporter in a height adjustable manner, the pot being adapted to accommodate a plant, roots of the plant being partly exposed in air and further partly immersed in the nutrient solution inside the sunken structure by height difference between the pot and the at least one supporter.

* * * * *